No. 841,434. PATENTED JAN. 15, 1907.
E. L. & F. A. PEQUEGNAT & C. W. MILAN.
MOTOR CYCLE.
APPLICATION FILED MAR. 12, 1906.
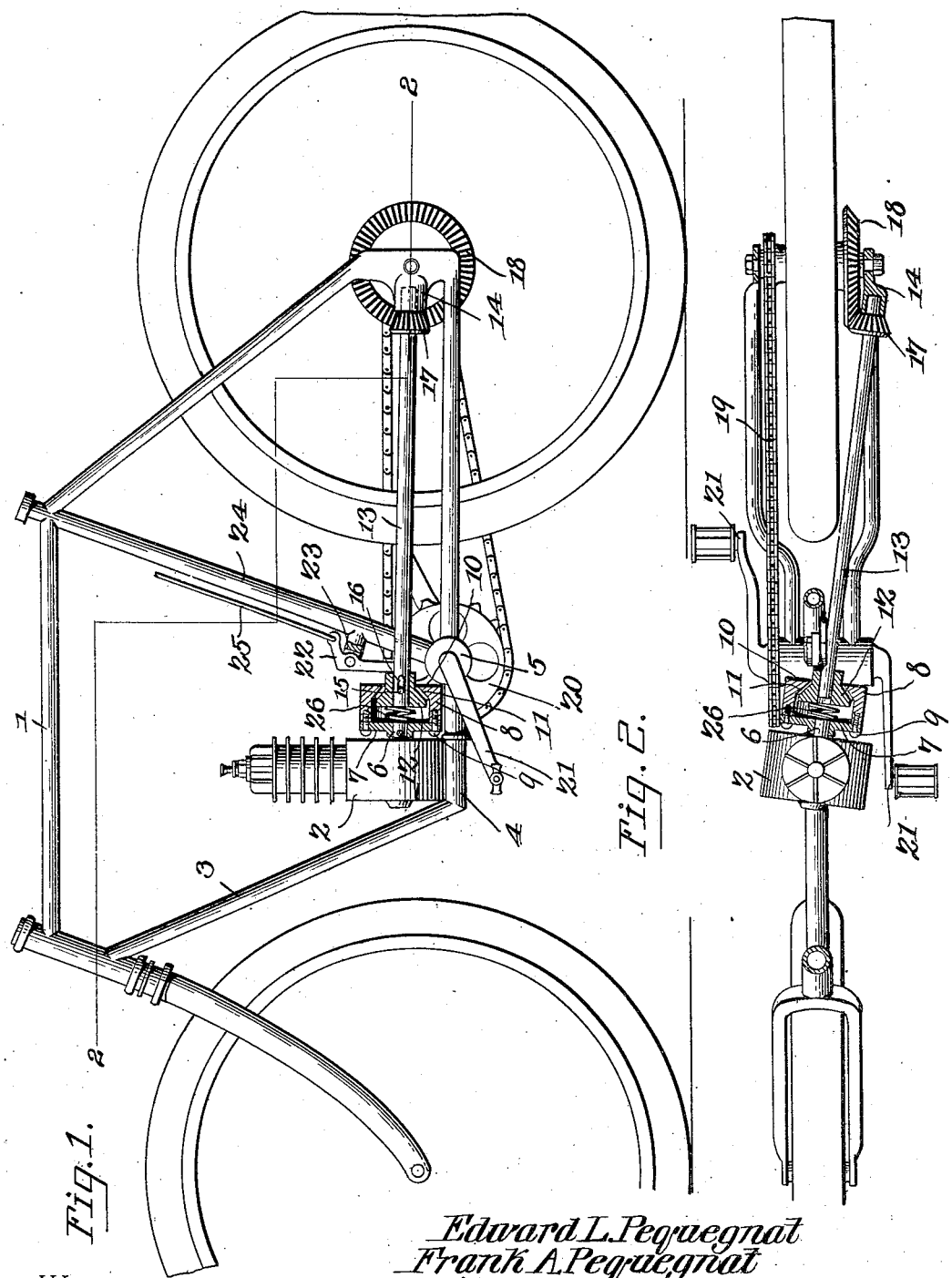
WITNESSES:
E. F. Stewart
H. S. Shepard
Edward L. Pequegnat
Frank A. Pequegnat
Charles W. Milan
INVENTORS
By C. A. Snow & Co.
ATTORNEYS

UNITED STATES PATENT OFFICE.

EDWARD L. PEQUEGNAT, FRANK A. PEQUEGNAT, AND CHARLES W. MILAN, OF RIVERSIDE, CALIFORNIA.

MOTOR-CYCLE.

No. 841,434.  Specification of Letters Patent.  Patented Jan. 15, 1907.

Application filed March 12, 1906. Serial No. 305,672.

*To all whom it may concern:*

Be it known that we, EDWARD L. PEQUEGNAT, FRANK A. PEQUEGNAT, and CHARLES W. MILAN, citizens of the United States, residing at Riverside, in the county of Riverside and State of California, have invented a new and useful Motor-Cycle, of which the following is a specification.

This invention relates to motor-cycles, and is designed to improve and simplify the power-transmitting mechanism between the motor and the drive-wheel of the cycle. In this connection it is proposed to provide an improved yieldable power-transmitting mechanism whereby excess motion due to the rapid impulses of the motor are compensated for, thereby to prevent slipping of the drive-wheel upon the ground and to maintain a regular operation of the drive-wheel.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a side elevation of a bicycle equipped with the improvements of the present invention, the clutch of the drive mechanism being shown in section. Fig. 2 is a plan section on the line 2 2 of Fig. 1, with the clutch in section.

Like characters of reference designate corresponding parts in all of the figures of the drawings.

As exhibited in the accompanying drawings, the present invention has been applied to a bicycle, the frame of which is designated in general by the reference character 1, and to accommodate any appropriate rotary explosive or impulse engine or motor 2 the lower front reach-bar 3 of the frame is provided at its lower end with a substantially horizontal portion 4, extending forwardly from the crank-hanger 5. The motor is set transversely of the frame of the machine, with its power-shaft 6 disposed in a general direction longitudinally of the frame and carrying a hollow cylindrical clutch member, including a disk or head 7, rigid upon the shaft and having a cylindrical shell 8, rigidly connected to the rear face of the head—as, for instance, by fastenings 9. The rear end of the shell element is provided with an external annular flange 10, which is beveled upon its inner side, as at 11. Working within the drive member of the clutch is the driven conical clutch member 12, working in frictional relation with the beveled face of the flange 10 and tubular in form to receive the forward end of the drive-shaft 13, which has its rear end mounted in a thrust-bearing 14, provided at the rear lower end of the adjacent rear fork of the frame of the bicycle. The clutch member 12 is fixed to the shaft, so as to rotate therewith, and is capable of a limited slidable movement thereon, preferably by means of a pin or key 15, carried by the clutch member and working in a longitudinal slit 16 in the shaft. At the rear end of the shaft there is a beveled pinion 17 in mesh with a beveled gear 18 upon the rear axle of the bicycle.

Upon the opposite side of the bicycle from the shaft 13 there is the usual sprocket-chain 19, running to the sprocket-wheel 20, which is driven by ordinary pedal-cranks 21 for use in controlling the bicycle when the latter is uncoupled from the motor.

For throwing the motor into and out of operation there is an upstanding bell-crank or angular lever 22, fulcrumed upon a bracket 23, provided upon the seat-post tube 24. The lower end of this lever is in frictional relation with the rear end of the clutch member 12, and to its upper end is engaged a suitable connecting-rod 25, which is hand-controlled in any suitable manner. (Not shown upon the accompanying drawings.)

In practice the rod 25 is forced downwardly, so as to move the clutch member 12 forwardly against the resistance of the spring 26, which is interposed between the two clutch members, thereby to move the driven clutch member 12 out of engagement with the driving clutch member, whereupon the bicycle may be driven by manipulation of the crank-pedals until the bicycle and the shaft 13 have acquired the desired momentum, whereupon the lever 22 is released, so as to permit the spring 26 to force the slidable clutch member rearwardly into frictional engagement with the driving clutch member, whereby the power-shaft of the motor will be given the necessary initial motion to start the sparking apparatus and to set the motor in operation. When the motor is in operation, power will be transferred from the power-shaft 6 to the rear axle of the bicycle through the medium of the clutch, the shaft 13, and the pinion 17. By reason of the fact that the clutch members are in frictional engagement too rapid rotation of the power-shaft will be automatically compensated for by reason of the driving clutch member slipping around upon the driven clutch member, thereby preventing too rapid rotation of the rear bicycle-wheel, and thus obviating unnecessary wear upon the tire thereof, as will occur by the slipping of the wheel upon the ground when rotated too rapidly.

Having thus described the invention, what is claimed is—

1. The combination with a bicycle, of an impulse-motor carried thereby, a drive-shaft connected to the rear wheel of the bicycle, a clutch member carried by the power-shaft of the motor, another clutch element slidable upon the drive-shaft in frictional relation with the first-mentioned clutch member, and means mounted upon the frame of the bicycle and associated with the slidable clutch member to move the same with respect to the other clutch member.

2. The combination with a bicycle, of an impulse-motor carried thereby, a hollow clutch member carried by the power-shaft of the motor and provided with an internal annular beveled friction-face, a drive-shaft connected to the rear wheel of the bicycle in alinement with the power-shaft, a conical clutch member slidable upon the drive-shaft within the hollow clutch member in frictional relation with the friction-surface, a spring tending to normally force the slidable clutch member into engagement with the other clutch member, and means for moving the slidable clutch member against the tension of the spring.

3. The combination with a bicycle, of an impulse-motor carried thereby between the seat-post tube and the lower reach-bar of the frame with its power-shaft disposed longitudinally of the bicycle, a drive-shaft connected to the rear wheel of the bicycle in longitudinal alinement with the power-shaft, a hollow driving clutch member carried by the power-shaft between the motor and the seat-post tube, a conical clutch member slidably carried by the forward end of the drive-shaft within the hollow clutch member and in frictional relation therewith, a spring interposed between the two clutch members to yieldably maintain them in frictional engagement, and a bell-crank lever mounted upon the seat-post tube and associated with the slidable clutch member.

In testimony that we claim the foregoing as our own we have hereto affixed our signatures in the presence of two witnesses.

EDWARD L. PEQUEGNAT.
FRANK A. PEQUEGNAT.
CHARLES W. MILAN.

Witnesses:
D. F. VESZY,
MYRON MIEIER.